United States Patent [19]

Norman et al.

[11] Patent Number: 4,525,501

[45] Date of Patent: Jun. 25, 1985

[54] PROTECTION AGAINST SOILING

[75] Inventors: Edward C. Norman; Howard A. Dowell, both of Downingtown, Pa.

[73] Assignee: Enterra Corporation, Lionville, Pa.

[21] Appl. No.: 308,261

[22] Filed: Oct. 5, 1981

Related U.S. Application Data

[62] Division of Ser. No. 066,022, Aug. 13, 1979, Pat. No. 4,347,266.

[51] Int. Cl.$^3$ .................................................. C08L 5/04
[52] U.S. Cl. ...................................... 524/28; 524/238; 524/247
[58] Field of Search .......................... 524/238, 247, 28

[56] References Cited

U.S. PATENT DOCUMENTS

| | | | |
|---|---|---|---|
| 2,467,436 | 4/1949 | Lanning | 524/247 |
| 2,664,365 | 12/1953 | Piana et al. | 524/28 |
| 2,816,326 | 12/1953 | Watts | 524/28 |
| 3,821,147 | 6/1974 | Dickson | 524/247 |
| 4,055,441 | 10/1977 | Taylor et al. | 428/319.1 |
| 4,089,804 | 5/1978 | Falk | 252/351 |

*Primary Examiner*—Joseph L. Schofer
*Assistant Examiner*—N. Sarofim
*Attorney, Agent, or Firm*—Connolly & Hutz

[57] ABSTRACT

Water-resistant articles such as automobile surfaces are protected against soiling from asphalt undercoating, paint overspray and the like, by applying a pre-coat film of polymer that is readily flushed off with water after the soiling exposure is terminated. Pre-coat is preferably applied from aqueous dispersion and has sufficient levelling agent content to keep it from separating into droplets when applied on a heavily waxed surface. Fluorinated surfactants, by themselves or mixed with silicone surfactants, are effective levelling agents. Alginate and half-acid half-amide 3-dimethylaminopropylamine-reacted ethylene-maleic anhydride polymers are very good film-formers, although others can be used. The film-formers are preferably heavily plasticized with glycerine or other water-soluble plasticizer.

9 Claims, No Drawings

PROTECTION AGAINST SOILING

This application is a division of application Ser. No. 066,022 filed Aug. 13, 1979, now U.S. Pat. No. 4,347,266.

The present invention relates to the protecting of water-resistant articles against soiling.

Among the objects of the present invention is the provision of a novel technique and composition for temporarily coating water-resistant articles to protect them from becoming soiled by exposure to undesired materials.

The foregoing as well as additional objects of the present invention will be more fully recognized from the following description of several of its exemplifications.

According to the present invention a water-resistant article such as an automobile is protected against soiling by coating the article with a water-dispersible film containing hydrophilic plasticizer in an amount that keeps the coating from curing to a water-impervious condition. After exposure to soiling conditions such as the spray application of an asphalt undercoating, the water-dispersible film is flushed off with water.

While many different hydrophilic plasticizers are practical for the above use, the preferred plasticizer is glycerine inasmuch as it is relatively inexpensive as well as highly effective. Other suitable plasticizers include hexoses, di-saccharides, pentoses, tetroses, ethylene glycol, diethylene glycol, polyethylene glycols, glycol ethers such as methyl cellosolve, butyl cellosolve, butyl carbitol, (butoxy-ethoxy)-propanol-2, and pentaerythritol.

A particularly preferred water-dispersible film is an alginate film such as formed by aqueous solutions of alkali metal or ammonium alginates. Other film-formers that can be used include the half-amide half-acid dimethylaminopropylamine-reacted ethylene-maleic anhydride polymers described in column 8 of U.S. Pat. No. 3,957,657, as well as film formers used in other aqueous fire-fighting compositions, including those referred to in U.S. Pat. Nos. 3,531,427, 2,378,629 and 3,388,106.

A feature of the present invention is the fact that the articles to be protected do not have to have their surfaces cleaned before the protective film is applied. Indeed the aqueous film-forming solution wets an automobile surface better when that surface is covered with road dust as compared to when that surface is perfectly clean. Moreover the flushing off of the water-dispersible film removes considerable road dust and the like so that the protected surface is significantly cleaned by the treatment of the present invention.

In order to effectively cover water-repellent surfaces such as heavily waxed or polished automobile exteriors, the film-forming coatings should contain a significant amount of levelling agent. Thus about 0.02% to about 1% of fluorinated surfactant enables the film to be applied to a large automobile by a very brief spray treatment taking only a few minutes. The film so applied is self-levelling and will spread to cover the entire automobile surface even if the automobile's exterior paint is well waxed and shined, or has a shined silicone polish coating.

The following examples are illustrative of the present invention.

EXAMPLE 1

A film-forming mixture is prepared from, by weight:

| | |
|---|---|
| Water | 73 parts |
| Sodium alginate | 1 part |
| The half-amide half-acid dimethylaminopropylamine-reacted ethylene-maleic anhydride copolymer, prepared as described in column 8 of U.S. Pat. No. 3,957,657 | 0.5 part |
| $(CF_3)_2CF(CF_2)_nCOO^{-\,+}NH_3C_2H_5$ where n is a mixture of 5 (30%), 7 (30%), and 9 (balance) | 0.25 part |
| 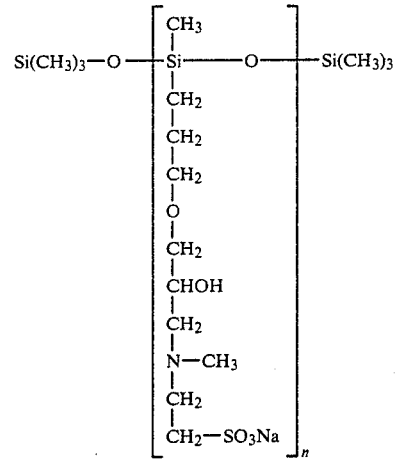 where n ranges from 2 to 5 and averages 3 | 0.25 part |
| Glycerine | 25 parts |

The ingredients are mixed in the above order, the alginate being completely dissolved in the water before adding the remaining ingredients. These remaining ingredients are preferably prepared as water solutions so that they are more conveniently added. The silicone ingredient is best solubilized with the help of a little isopropanol, and should be kept in an alkaline pH such as 7.6 for greatest stability.

The foregoing mixture is a viscous colloidal solution that is not transparent but flows quite readily. It is used by first diluting it with an equal volume of water and then spraying the diluted material with an air atomizing spray gun, such as a Binks Model 18 gun with a 67SA sprayhead. The sides, top, front and back of an automobile are easily and quickly covered if the spray head is kept about 6 inches or so from the surface. A very light coating is all that is needed, and a 0.2 mil thick film after its water is permitted to evaporate for a minute or two, is very effective. Some problem areas such as those near the bottom of the car can be given a second coat.

The car is now ready for its bottom to receive an asphalt spray such as ordinarily used as undercoating. The asphalt can be cut back with mineral spirits to make a sprayable mixture, or it can be in the form of an emulsion in water. Some overspray can reach the previously coated car surface, but will not permanently soil the car.

There is no drying period needed between the preparatory or pre-coating, and the asphalt coating steps. Moreover, if needed, the pre-coated car can be permitted to stand several days, in the shade or the hot sun, before the asphalt is applied. After the asphalt application is completed, the pre-coat is readily removed with water, preferably a forceful stream, from a hose supplied with water at several hundred pounds per square inch and equipped with a constricting nozzle such as a power wash nozzle. Flushing with a garden hose will remove the entire coating in a couple of minutes, but tends to permit a significant amount of asphalt on the pre-coat to deposit on the painted surface on the other hand flushing with water supplied by a 600 pounds per square inch stream of water permits almost no such transfer of asphalt.

When applying the pre-coat of the present invention to an automobile having an exposed engine radiator, there is no need to keep the pre-coat from reaching the heat-exchange surface of such radiator. The pre-coat does not injure such surface, and while it can reduce the heat-exchange effectiveness if not removed, such removal takes place when driving in the next rain, and also tends to melt and run off when the engine is operated to heat up the radiator to its usual operating temperature, even if the pre-coat is not flushed off beforehand.

The pre-coat of the present invention, when applied to a window, can make it difficult to see clearly through the window. It is accordingly helpful to leave some window area uncoated where the automobile is to be driven from the pre-coat station to the asphalt-applying station or from the asphalt-applying station. Rolling down a window of the automobile after the window has been pre-coated will generally cause some of that pre-coat to be scraped from the window by the weatherstrip normally engaging its lower portion. Windows are readily cleaned of any asphalt overspray they may receive, as by a dab with a kerosene-wetted cloth.

In the event some of the pre-coat remains on the automobile after the flushing off treatment, no harm results inasmuch as the pre-coat does not cure or harden very much and will also generally be washed off by the next rain. When the surface of the automobile is dry the presence of residual pre-coat film is readily apparent so that it can be removed at any time.

Where an automobile is to be driven through mud or near a paint-spray operation or other soiling location after the asphalt application in order to deliver it to its owner, the pre-coat can be left on until the delivery is completed. There will then be greater assurance that the flushing off of the pre-coat will leave the car surface clean.

The amount of glycerine in the formulation of Example 1 can be diminished to about 3 times the weight of the film-former without serious reduction in the ease of flushing off the pre-coat. Using an amount of glycerine less than twice that of the film-forming makes the pre-coat appreciably more difficult to wash off so that substantially more time is needed for this operation. Further diminishing the glycerine content further increases the removal effort required, particularly if the pre-coat is permitted to remain on the automobile several hours in the hot sun. Omitting the glycerine completely will still leave the pre-coat usable, but best removed promptly.

The glycerine, or any other plasticiser used, should not be in such large amount as to cause the film formed by the composition to be liquid rather than solid.

The half-amide half-acid dimethylaminopropylamine-reacted ethylene-maleic anhydride can also be omitted, or reduced in amount, whether or not the amount of plasticizer is changed. The character of the pre-coat is changed slightly by such modifications, but its removability is not noticeably altered.

Reducing the amount of alginate has a more significant effect. In the event there is a heavy overspray of asphalt that reaches the pre-coat, the tendency of the asphalt to transfer to the car surface when the pre-coat is flushed off has been found noticeably minimized when the pre-coat film former is a water-soluble alginate, or where such alginate is at least about two-thirds of the film former by weight. The plasticizer is not counted as a film former for the purposes of such computation.

One suitable formulation in which an alignate is not used is shown by the following recipe.

EXAMPLE 2

| Ingredient | Quantity Per Gallon Of Completed Formulation |
| --- | --- |
| Water | 0.63 gallons |
| 30% by weight solution in water of equal parts of octyl and decyl sulfates | 0.014 gallons |
| The ethylene-maleic anhydride copolymer of U.S. Pat. No. 2,396,785 | 0.42 lbs. |
| 3-dimethylaminopropylamine | 0.049 gallons |
| Glycerine (96%) | 0.298 gallons |
| $CF_3(CF_2)_nCH_2CH_2SCH_2CH_2N^+(CH_3)_2CH_2COONa^-$ where n ranges from 5 to 9 (30% by weight in water) | 0.0009 gallons |
| The silicone levelling agent of Example 1 (30% by weight in 1:1 water-isopropanol) | 0.0009 gallons |

The ingredients are added in the listed order, and the copolymer is fully dispersed with agitation before the 3-dimethylaminopropylamine is added. Such addition causes the amine to react with the copolymer to produce in situ the half-amide half-acid of Example 1. This reaction is sufficiently complete after about 1¼ hours. A little biocide such as orthophenoxyphenol can be added to the recipe is desired, and the recipe is used in the same way as that of Example 1.

The ethylene and maleic anhydride contents of the polymer of U.S. Pat. No. 2,396,785 are preferably in a proportion from about 40:60 to 60:40 by weight, and at least about 80%, preferably at least 95%, of the anhydride groups are amidated with the 3-dimethylaminopropylamine. Omega-dimethylamino alkylamines having alkyl chains 2 to 5 carbons long, and branched or unbranched, can be used as amidating agents.

Other film-formers that can be used to advantage include degraded and modified alginates, polyvinyl acetate, polyvinyl alcohol, ethylene-maleic anhydride co-polymers that are not reacted with an amine, and polyvinyl alcohol. Where the film-former is not sufficiently soluble in water, it is dispersed with the help of any convenient dispersing agent. A little caustic soda is sufficient for dispersing polyvinyl acetates that are not sufficiently water-soluble, but pre-coat films of such a film-former tend to become less water-soluble on standing in the hot sun, even when heavily plasticized.

When surface-active agents are used in the pre-coat formulations, whether as levelling agents or dispersing agents, their total concentration should be held down to not over 2% (before the 1:1 dilution that preceded the application of the pre-coat). Excessive concentrations greatly promote the transfer of asphalt overspray to the surface of the automobile when the pre-coat film is flushed away. Low-foaming surfactants can be used, to restrain the tendency for foam formation on spraying. However best results are obtained when the total surfactant concentration is at the minimum needed to provide levelling on waxed, polished, or water-repellent surfaces. Without the levelling actions the pre-coat dispersion forms separate droplets on the surface to which it is applied, and these droplets do not flow together, thus leaving large amounts of the surface unprotected.

Fluorinated surfactants have been found to provide the most effective levelling action when they are the only levellers used and should be present at least to the extent of 0.04% before dilution or 0.02% after dilution. Silicone surfactants are also powerful levellers but not as powerful as the fluorinated surfactants. Indeed to insure adequate levelling on heavily waxed surfaces, it is usually necessary to use so much silicone surfactant, when that is the only surfactant, that significant transfer of asphalt overspray takes place from the pre-coat to the surface under the pre-coat upon flushing off the pre-coat.

Mixtures of fluorinated surfactant and silicone surfactant appear to be the most powerful levellers. Such mixtures containing from about 20% to about 80% of the respective surfactants, and preferably about 40% to about 60% of each, provide better levelling than the fluorinated surfactant alone. These preferred mixtures need not be present in a combined concentration over about 0.5% in the pre-coat dispersion, before it is diluted with an equal volume of water, in order to obtain the best assurance that asphalt overspray will not be found on the automobile surface after the pre-coat is flushed off. The mixture of fluorinated surfactant and silicone surfactant is about as effective for levelling, as an equal weight of the fluorinated surfactant alone, and accordingly the minimum amount of such a mixture is also about 0.02% by weight of the dispersion as applied to the surface being protected.

The fluorinated surfactants for the present invention are those containing a terminal perfluorinated chain from about 5 to about 12 carbons long. Branches on this chain are not helpful and are not counted in determining the chain length. The balance of the molecule can be a hydrophilic group, and these surfactants can be anionic, non-ionic, cationic, or amphoteric, but cationic surfactants tend to require or contribute too much acidity and thus destabilize silicone surfactants also present in the pre-coat mixture. Up to about 10% of the fluorine atoms in the above-referred-to-chain can be replaced by a different halogen atom or even by hydrogen, without detracting too much from the effectiveness of the surfactant.

The silicone surfactants for the present invention have a terminal polysiloxy chain containing at least 3 and up to about 10 silicon atoms alternating with oxygen atoms. At least about $\frac{3}{4}$ of the remaining bonds of these silicon atoms, that is the bonds not connected with the oxygens, should be to lower alkyl groups, preferably methyl. The balance of the remaining bonds are best connected with water-solubilizing groups, and indeed it is helpful to have at least two hydrophilic groups connected to adjacent silicon atoms in the molecule. The silicone surfactants can also be anionic, non-ionic, cationic, or amphoteric, but here again a cationic structure tends to be too acid to be stable for long periods of time. Examples of suitable fluorinated surfactants and silicone surfactants are given in the above-noted U.S. Pat. No. 3,957,657.

Where the pre-coats of the present invention are used within a few weeks of their preparation, the destabilizing of the silicone surfactant is not serious and can be tolerated.

When compounding the pre-coat formulations of the present invention, samples are best tested as by spraying them, after dilution to the working concentration, onto a specially prepared metal panel. For such preparation the panel is painted with a light-colored automotive paint and after the paint is cured is then waxed as by application of a high quality automobile wax.

The sprayed-on pre-coat should form a continuous film. If it does, it is permitted to dry for thirty minutes and then subjected to an asphalt spray as used to apply standard undercoating. The panel is now given a high pressure hosing to remove the pre-coat, and promptly inspected for black spots. Only a few spots per square foot can be tolerated, provided the spots are too small to be seen with the naked eye.

The test can be repeated using prolonged drying at 150° F. in direct sunlight. Heavily orange-peeled pre-coatings should be avoided inasmuch as they can have coating portions too thin to provide the desired resistance to fresh asphalt.

The foregoing tests are rather severe inasmuch as the asphalt is deliberately applied to the pre-coat, so that it carries at least as much asphalt as the maximum likely to be present when on an automobile that is given the usual undercoating and only unintentional overspray reaches the pre-coat. Accordingly the presence of a few asphalt spots after the test is completed, indicates that not much asphalt will be found when the usual undercoating operation is carried out. A kerosene-wetted cloth easily removes residual spots from painted surfaces, and also removes asphalt applied to the pre-coat when an attendant leans an asphalt-coated hand against it.

Asphalt undercoating is frequently applied to internal panels of an automobile, as by drilling a hole in a door hinge panel and inserting an asphalt spray pipe through the hole to coat the hollow interior. Upon such insertion, or upon withdrawal of the asphalt spray pipe, asphalt tends to spill or spray on the outer surface around and below the drilled hole. The outer surface can simply be heavily asphalted, but it can alternatively be pre-coated in accordance with the present invention to keep asphalt from permanently adhering.

The transfer of asphalt spots to the surface under the pre-coat upon flushing, is also reduced when the pre-coat is made very heavy, that is more than 0.2 mil thick. To this end the pre-coat operation can be repeated, as noted above, particularly on the lower portion of an automobile, to build up the pre-coat thickness where the asphalt overspray is more likely to find its way.

To reduce the time needed for applying the pre-coat to an automobile, the dispersion as applied should be quite dilute and contain not over about 5% film-former. Higher concentrations tend to be too viscous and more difficult to spray rapidly in large volume. Film-former concentrations below about ¼%, based on the weight of the dispersion as sprayed are not desirable. In general, whether diluted for spraying or undiluted before spraying the film-former concentration should range from about ¼% to about 10%.

Obviously many modifications and variations of the present invention are possible in the light of the above teachings. It is, therefore, to be understood that within the scope of the appended claims the invention may be practiced otherwise than as specifically described.

What is claimed:

1. A protective composition that deposits a solid protective coating film which can be flushed off with water, said composition being an aqueous dispersion of a water-dispersed film former containing about ¼% to about 10% of the film former by weight, a hydrophilic plasticizer for the film former, the amount of such plasticizer being more than twice that of the film former by weight, the composition containing a levelling agent for the plasticized film former, the agent being in an amount that causes the composition to essentially uniformly wet a water-repellent surface, the composition being removable by flushing with a water jet after drying and then standing in the hot sun for several days, and the composition also containing not over 2% total surfactant.

2. The composition of claim 1 in which the amount of plasticizer is at least 7 times that of the film former by weight.

3. The composition of claim 1 in which the plasticizer is essentially glycerine.

4. The composition of claim 1 in which the film former is essentially an ethylene-maleic anhydride polymer that has been converted to a water-soluble half-acid half-amide, by reaction with N,N-dimethyl trimethylene diamine.

5. The composition of claim 1 in which the film former is essentially an alginate.

6. In an aqueous surfactant-containing dispersion of a film-former for application to a surface to form a temporary protective film that can be subsequently flushed off with water, the improvement according to which the dispersion contains not over 1% total surfactant, but contains at least 0.02% fluorinated surfactant leveling agent to cause the dispersion to form a relatively level coating film over essentially all of a heavily waxed or shined hydrophobic surface to which the dispersion is applied.

7. The combination of claim 6 in which the aqueous dispersion also contains silicone surfactant leveling agent that improves the leveling of the coating.

8. In an aqueous surfactant-containing dispersion of film-former for application to a surface to form a temporary protective film that can be subsequently flushed off with water, the improvement according to which at least about two-thirds of the film-former is water-soluble alginate, the dispersion contains not over 1% total surfactant and also contains a hydrophilic plasticizer for the film produced by the film-former, the amount of plasticizer being more than three times the weight of the film-former.

9. The combination of claim 8 in which the plasticizer is glycerine and is in a concentration at least seven times that of the film-former.

* * * * *